Patented Apr. 17, 1928.

1,666,618

UNITED STATES PATENT OFFICE.

ALBIN CARLSON, OF DEGERHAMN, SWEDEN.

METHOD OF BRIQUETTING.

No Drawing. Application filed April 8, 1925, Serial No. 21,739, and in Sweden May 10, 1924.

The present invention relates to a method of briquetting purple-ore, burnt pyrites, industrial residual and waste products, containing the compound $Fe_2O_3$, and mixtures comprising ores and one or more of said products.

It is already known to treat pulverulent metallic ores by processes of the kind wherein the pulverulent of fine ore is mixed with lime or other binding or fluxing agent and briquetted and thereafter subjected to the action of steam under pressure in order to harden the resulting briquettes.

This invention has for its object to provide an improved process of the said kind by causing a hydraulic binding effect to be produced whereby an extremely intimate connection and hard product will be obtained as compared with products available by the methods hitherto proposed.

According to the present invention in order to obtain the said hydraulic effect I use as material to be treated ores or industrial products containing in itself or as a result of their previous industrial treatment or as a result of a calcining or similarly acting process a hydraulic factor capable, when intimately mixed with burnt lime, as in the form of oxide, to produce a hydraulic effect.

In carrying the invention into effect I make use of purple-ore, burnt pyrites, industial residual and waste products, containing the compound $Fe_2O_3$, and mixtures comprising ores and one or more of said products.

If the material to be used does not in itself, or as a result of a prior industrial process, contain a hydraulic factor, as for instance, the compound $Fe_2O_3$, said material is subjected to a preliminary treatment with the object in view of causing the production in said material of such a factor. Thus, for instance, I use purple-ore, burnt pyrites, other burnt iron products, not treated with acid, base or salt in any state, or fine ore either calcined or treated with acid, base or salt in any state, or subjected to a combined treatment, similar to a chlorinating calcining process with the object in view of causing the productiion of the hydraulic factor. An addition of lime higher than 3% has not resulted in any appreciable increase of the strength of the steam hardened briquettes. An addition of lime above 6% seems to result in a reduced strength. The amount of lime to be added is of substantial importance as to the economy of the method, as each percent of lime added will at a normal lime price increase the cost of briquetting by about 5 cents per each 1000 kg.

Furthermore, I have found that an equally high hydraulic action may be obtained by mixing pulverous or finely divided iron ores, fine ore or concentrates, with the aforesaid products, as purple-ore, burnt pyrites other burnt iron products, or other fine ore or concentrates prepared in the manner thereinbefore stated in various proportions according to the chemical composition and degree of division, adding small amounts of burnt lime to said various mixtures as in the case above described, distributing said lime evenly and thoroughly in said mixture, pressing the mixture thus produced into briquettes, and hardening said briquettes by steam.

The following examples may be stated of mixtures which in the practice have given good results: 5% of purple-ore+95% of fine ore or concentrates, 10% of purple-ore+ 90% of fine ore or concentrates, 15% of purple-ore+85% of fine ore or concentrates, etc.

According to this invention the briquetting and steam hardening processes are not effected until after the addition to the briquette mixture of small amounts of a catalyst, preferably a cheap catalyst, as lime. In case of using lime as catalyst it is believed that said lime will also act as a hydraulic factor. The lime will under the given conditions cause the production of solid solutions during the accelerated binding process, said solutions taking the nature of hydraulic factors. The hydraulic factors produced in the said manner will effect the binding process. In this case the important factor $Fe_2O_3$ will act sometimes as a basic factor and sometimes as a hydraulic factor.

What I claim is:

1. A method of producing briquettes, which comprises treating finely divided iron ores and products containing iron compounds capable of being reduced, with the purpose in view to produce hydraulic properties therein, adding a small amount of separately burnt lime thereto, pressing the mixture thus obtained into briquettes, and hardening said briquettes by high pressure steam.

2. A method or producing briquettes, which comprises treating finely divided iron ores and products containing iron compounds capable of being reduced, with the purpose in view to produce hydraulic properties therein, mixing said material with other pulverous iron ores not having such hydraulic properties, adding a small amount of separately burnt lime thereto, pressing the mixture thus obtained into briquettes, and hardening said briquettes by high pressure steam.

3. A method of produciing briquettes, which comprises treating finely divided iron ores and products containing iron compounds, capable of being reduced, with the purpose in view to produce hydraulic properties therein, adding at most 6% of separately burnt lime to said mixture, pressing the mixture into briquettes, and hardening said briquettes by high pressure steam.

4. A method of producing briquettes, which comprises treating finely divided iron ore and products containing iron compounds capable of being reduced, with the purpose in view to produce hydraulic properties therein, mixing said material with other pulverous iron ores not having such hydraulic properties, adding at most 6% of separately burnt lime to said mixture, pressing said mixture into briquettes, and hardening said briquettes by high pressure steam.

In testimony whereof I have signed my name.

ALBIN CARLSON.